Nov. 13, 1962 S. H. HARWIG 3,063,881
METHOD OF MAKING AN ELECTRICALLY CONDUCTIVE ARTICLE
Filed Sept. 14, 1956

INVENTOR.
Stephen H. Harwig
BY
Nobbe & Swope
ATTORNEYS

United States Patent Office 3,063,881
Patented Nov. 13, 1962

3,063,881
METHOD OF MAKING AN ELECTRICALLY CONDUCTIVE ARTICLE
Stephen H. Harwig, Pittsburgh, Pa., assignor to Libbey-Owens-Ford Glass Company, Toledo, Ohio, a corporation of Ohio
Filed Sept. 14, 1956, Ser. No. 609,905
1 Claim. (Cl. 154—2.7)

This invention relates to electrically conductive articles and to a method of producing such articles. More particularly, it relates to a method of changing the resistance of an electrically conductive film provided on such articles.

Although the invention is in no way restricted to any particular article or type of electrically conductive film, it has been found to have excellent utility when used in connection with transparent electrically conductive films of the type described in U.S. Patent No. 2,628,927, issued February 17, 1953. Articles having electrically conductive films of this type have been used for many applications such as for de-icing and de-fogging aircraft and automotive windshields, lenses, camera windows and other uses. When used for such purposes it is necessary that the electrically conductive films of the articles have resistances within specified limits so that the article will be heated to the proper temperature.

Heretofore when the resistance of the electrically conductive film was found to be too high or too low, it was generally common practice to discard the article. This practice has been extremely expensive since in many cases the films have been provided on costly, specially ground, shaped or treated lenses and other optical parts.

It is therefore a primary obect of the invention to provide a novel article and method of effectively changing the resistance of an electrically conductive film after it has been placed on the article.

It is a further object of the invention to provide a novel method of changing the resistance of a film on a support body which does not require that the electrically conductive film be altered.

A still further object of the invention is to provide a method of altering the resistance characteristics of electrically conductive films on optical elements which is both economical and fast.

Other objects and advantages of the invention will become more apparent during the course of the following description when taken in connection with the accompanying drawings.

In the drawings wherein like numerals are used to designate like parts throughout the same:

Figure 1:
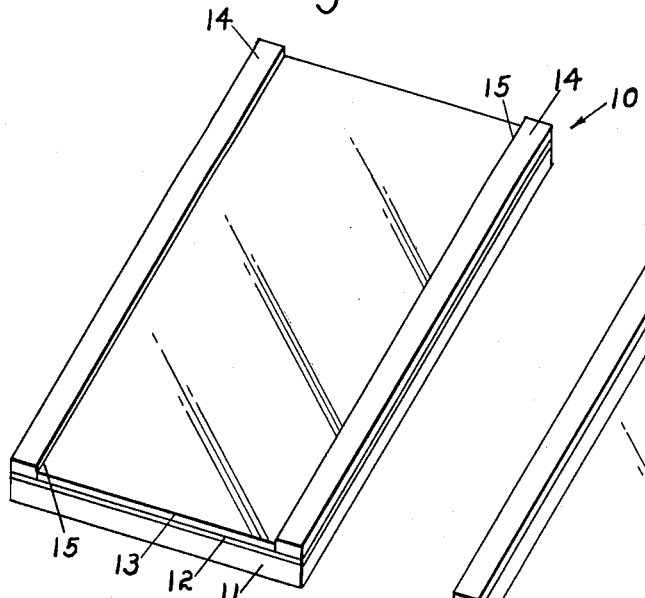
FIG. 1 is a perspective view of an electrically conductive article.

While the invention will be described particularly in connection with electrically conductive films of the type described in the above-noted U.S. Patent No. 2,628,927, it of course may also be used in conjunction with other types of electrically conductive films and is not necessarily restricted to any particular type or types of such films.

Referring now to the drawings, there is shown an electrically conductive article in FIGS. 1 to 4, designated in its entirety by the numeral 10. Basically, the article comprises a support body 11 of siliceous or plastic material having a thin film of electrically conductive material 12 adhered to and extending over a surface thereof. A hard transparent protective layer 13 of quartz, magnesium fluoride or other protective material may be provided over the electrically conductive film to protect the surface of the film from scratching or marring effects which distort the optical properties of the article and cause the electrically conducting film to burn out because of current concentrations along such areas.

In order to bring power to the electrically conductive film 12, it is necessary that electrodes or bus bars 14 be provided in contact with the film 12. These electrodes may be of any one of a number of different materials and can be applied in any convenient manner. For example, electrodes of sprayed copper; sprayed copper alloys; baked-on gold; silver; platinum fluxes; brushed, sprayed or silk-screened conducting inks containing gold, silver or platinum powder; and combinations of these materials may all be used satisfactorily.

After the electrically conductive article is formed as shown in FIG. 1, it is general practice to measure the resistance of the electrically conductive film 12 between the electrodes 14. Because of the thinness of the film and the areas involved, in some cases it has been found that the resistance between the respective electrodes is either above or below the resistance required to produce the proper heating effect. This results in the article being unsuitable because it either heats to a greater temperature or cannot heat sufficiently to obtain the necessary de-icing or de-fogging characteristics. Inasmuch as there was no way of changing the resistance of the film, in the past as pointed out hereinabove, it was therefore common to discard the entire unit.

According to the present invention, it has been found that the resistance of the electrically conductive film can be altered by changing the distance between the electrodes 14 and thus either increasing or decreasing the effective electrical path through the conductive film 12. Since the cross sectional area of an electrode is much greater than that of the electrically conductive film, the resistance of the electrodes is substantially less than the resistance of the electrically conductive film. Thus, for all practical purposes the effective resistance path of the electrically conductive film is the area between the inside edges 15 of the respective bus bars 14.

Figure 3:
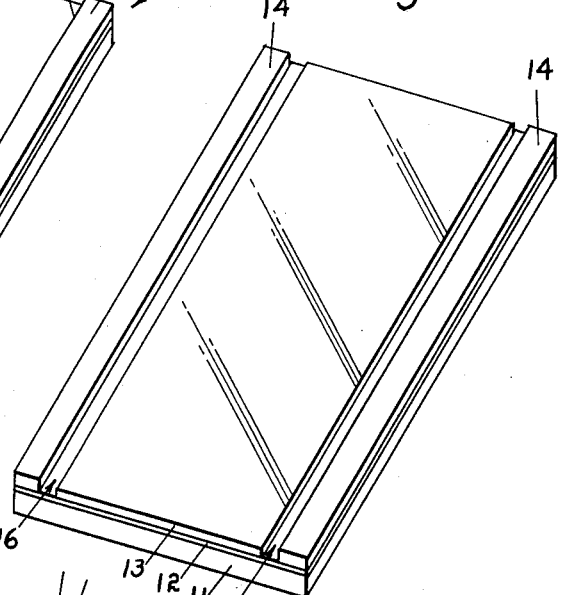
FIG. 3 is a fragmentary perspective view of the electrically conductive article of FIG. 1 showing a portion of the protective coating removed adjacent an electrode or bus bar.
Figure 2:
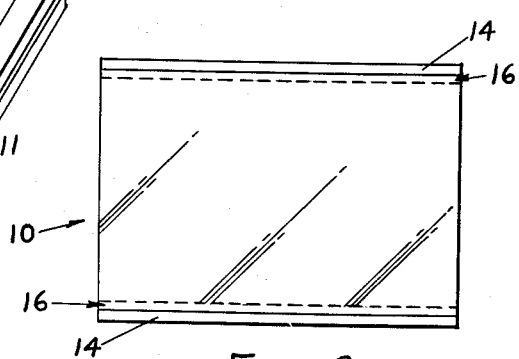
FIG. 2 is a plan view of the electrically conductive article of FIG. 1.

To decrease the resistance of the electrically conductive film 12, the protective layer 13 is removed as indicated at 16 in FIGS. 2 and 3. In the case of quartz the protective layer may be removed by a solution which does not react with the electrically conductive film. A preferred removal solution has been found to be one which comprises two parts saturated sodium fluoride and one part of a 10% hydrochloric acid solution.

An alternate solution that may be used in removing the quartz from along the bus bar area is formed of two parts saturated sodium fluoride and one part of an acetic acid solution. Other solutions that may be used are two parts sodium fluoride and one part phosphoric acid; or two parts of a saturated sodium fluoride solution and one part of a 4% solution of oxalic acid, or weak solutions of hydrofluoric acid, such as 10% solutions may also be used. However, most any solution containing fluorine ions would be operable to remove the quartz. In using a solution, however, it is usually desirable to mask the protective layer adjacent the area where it is desired to remove the protective coating.

Figure 4:
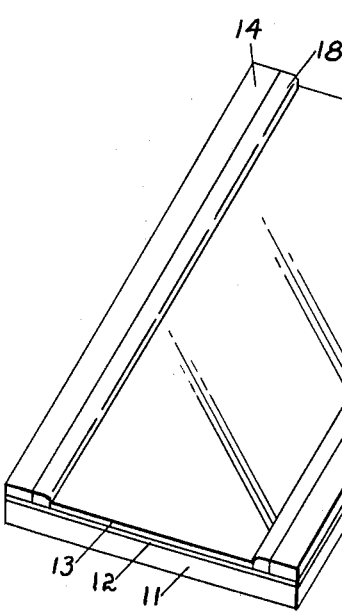
FIG. 4 is a fragmentary perspective view of the electrically conductive article shown in FIG. 1 illustrating an article after it has been changed so as to alter the resistance of the electrically conducting film.

After the protective coating has been removed as indicated at 16 in FIGS. 2 and 3, additional bus bar material 18 may be placed in contact with the electrically conductive film along the area 16 by means of a brush 19 or other means as shown in FIG. 4. The additional bus bar material 18 in contact with the electrically conductive film 12 thus decreases the effective area of the electrically conductive film and decreases the distance between the respective electrodes 14 thereby reducing the resistance of the film. It will of course be evident that the additional electrode material 18 may be placed along only one electrode if this should be more desirable.

Now, should the resistance of the electrically conductive film 12 between electrodes 14 be below that desired, areas of the bus bars or electrodes along the edge 15 may be removed by utilizing a solution which reacts with the bus bar material to place it in solution, or in some cases, abrasion methods may be used to remove portions of a bus bar or bus bars. By removing a portion of the bus bar in contact with the film, the film distance between the electrodes is increased thereby increasing the length of the electrical path and resistance of the film. In all cases it is generally desirable to use some masking means or guide means to enable the bus bar material to be removed along a neat and precise line. In areas where the electrodes have been removed a coating of Dek-All made by the American Crayon Corporation or similar material may be placed over the electrically conductive film as a protective coating.

While the invention has been described particularly in conjunction with an article having rectangular dimensions, it is also applicable to articles of various shapes and sizes. Furthermore, it will of course be evident that the invention is also applicable to electrically conductive coatings of the tin oxide variety and also when other protective coatings are used such as metallic oxides and metallic fluorides, or where protective coatings are dispensed with altogether.

It is of course to be understood that the form of the invention disclosed herein is to be taken as the preferred embodiment thereof and that various changes in the shape, size and arrangement of parts may be resorted to without departing from the spirit of the invention or the scope of the following claim.

I claim:

A method of uniformly increasing the overall resistance without altering the optical characteristics of a transparent electrically conductive article of the type wherein a transparent electrically conductive film having a protective coating thereon covers an entire surface of a transparent support body and a pair of spaced electrodes covering the film along oppositely disposed edges of the support body supply electric current to the film, which comprises masking at least one of the electrodes along a substantially straight line extending the entire length of the electrode, removing that portion of the electrode which lies between said line and the inner edge of the electrode to increase the distance through which the current passes as it flows between the electrodes, and placing a protective coating over the exposed surface of the film.

References Cited in the file of this patent

UNITED STATES PATENTS

| | | |
|---|---|---|
| 2,376,219 | Winslow | May 15, 1945 |
| 2,557,983 | Linder | June 26, 1951 |
| 2,628,927 | Colbert et al. | Feb. 17, 1953 |
| 2,710,900 | Linder | June 14, 1955 |

OTHER REFERENCES

Smith: Text entitled "Inorganic Chemistry," 3rd ed. (1921), page 283 relied upon.

Lowry: Text entitled "Inorganic Chemistry" (1931), pages 344–345 relied upon.